United States Patent
Stickney et al.

(10) Patent No.: US 6,971,486 B2
(45) Date of Patent: Dec. 6, 2005

(54) CALIPER SPRING CLIP WITH AXIAL FORCE DIRECTION

(75) Inventors: Scott M. Stickney, Lapeer, MI (US); Brian J. Burke, Rochester Hills, MI (US); Dirk F. Remde, Yokohama (JP); Stefan M. Wirth, Rochester, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 10/793,490

(22) Filed: Mar. 4, 2004

(65) Prior Publication Data

US 2005/0194222 A1    Sep. 8, 2005

(51) Int. Cl.[7] ............................................. F16D 65/38
(52) U.S. Cl. ............................... 188/73.35; 188/73.38; 188/73.39
(58) Field of Search ........................ 188/73.36, 73.37, 188/73.38, 73.35, 73.39

(56) References Cited

U.S. PATENT DOCUMENTS

| | | | |
|---|---|---|---|
| 4,392,559 A | | 7/1983 | Oshima |
| 4,609,077 A | * | 9/1986 | Nakatsuhara ............ 188/73.38 |
| 4,905,796 A | * | 3/1990 | Schonenberger et al. 188/73.39 |
| 5,330,035 A | | 7/1994 | Klimt et al. |
| 5,538,103 A | | 7/1996 | Rueckert et al. |
| 6,634,469 B2 | | 10/2003 | Störzel et al. |

FOREIGN PATENT DOCUMENTS

DE    2 004 958 A    4/1979

OTHER PUBLICATIONS

International Publication No. WO 97/22813, (PCT/EP96/05401) Published Jun. 26, 1997, Applicant Teves GmbH Alfred (DE), entited: Partially-Lined Disk Brake with a Floating Caliper (translation attached).

* cited by examiner

Primary Examiner—Matthew C. Graham
(74) Attorney, Agent, or Firm—Brinks Hofer Gilson & Lione

(57) ABSTRACT

A disc brake assembly for a motor vehicle includes a rotor, a bracket, a pair of brake pads slidably supported by the bracket for movement along a reference axis, and a caliper, also slidably supported by the bracket for movement along the reference axis, bridging the rotor periphery and operative to urge each brake pad into engagement with a respective friction surface of the rotor. A spring clip on the caliper includes a first pair of arms, each resiliently engaging a respective radially-disposed surface on the bracket to thereby releasably secure the spring clip to the caliper. The spring clip also includes a second pair of arms, each resiliently engaging a respective axially-disposed surface on the bracket to urge the outboard portion of the caliper along the reference axis away from the outboard friction surface of the rotor.

20 Claims, 2 Drawing Sheets

CALIPER SPRING CLIP WITH AXIAL FORCE DIRECTION

BACKGROUND OF THE INVENTION

1. Field of the Invention

The present invention relates generally to a spring clip for a disc brake assembly.

2. Description of Related Art

Floating-caliper disc brake assemblies for motor vehicles generally include a rotor, a pair of brake pads, a bracket adapted to be mounted on a vehicle knuckle, a caliper slidably supported on the bracket as with a pair of guide pins, and an actuator, which is typically a piston disposed in the caliper. The rotor is fixedly connected to the wheel of the motor vehicle such that the rotor and the wheel rotate together about the wheel axle. Each brake pad is slidably supported by the bracket on a respective side of the rotor. During operation, the piston is actuated to urge one of the brake pads, e.g., the inboard brake pad, into contact with its respective side of the rotor. Additionally, the piston actuation and corresponding engagement of the inboard brake pad with the rotor surface causes the caliper to slide inward along the wheelend axis, whereupon the outboard brake pad contacts the outboard side of the rotor.

The operation of such floating caliper disc brake assemblies is enhanced by a precise positioning of the brake pads in order to quickly engage and disengage the brake pads with the rotor when desired. A slow engagement between the brake pads and the rotor causes delays in braking time, while a slow disengagement between the brake pads and the rotor causes unwanted pad-rotor contact and premature wear. The outboard brake pad in floating caliper disc brake assemblies is especially susceptible to a slow disengagement from contact with the rotor because it is not in direct contact with the piston.

The outboard brake pad of known floating-caliper disc brake assemblies often exhibits a tendency to shift or "walk" either towards or away from the rotor when the piston is not actuated. Such brake pad shifting occurs because the floating caliper freely slides along the reference axis when the piston is not actuated and, therefore, the floating caliper is susceptible to axial movement from slight axial forces. Such axial forces may be caused by vehicle-specific tendencies, such as when the guide pins for the caliper are not in, or shift from, horizontal; or by driving-condition-specific tendencies, when the vehicle encounters a bump in the road which generates an axial force on the outboard brake pad.

Therefore, it is desirable to provide a disc brake assembly that facilitates disengagement of one of the brake pads from the rotor when the piston is deactivated and, preferably, continues to prevent unwanted contact between the one brake pad and the opposed rotor surface until a subsequent activation of the piston.

SUMMARY OF THE INVENTION

Under the invention, a disc brake assembly for a motor vehicle includes a rotor having an inboard friction surface, an outboard friction surface, and a peripheral edge; and a bracket supported proximate to the peripheral edge of the rotor and defining a pair of first, radially-disposed surfaces and at least one second, axially-disposed surface. The disc brake assembly also includes an outboard brake pad supported by the bracket opposite the outboard friction surface of the rotor, for movement along a reference axis, and a caliper slidably supported by the bracket for movement along the reference axis and having an outboard portion adapted to urge the outboard brake pad toward the rotor.

The disc brake assembly further includes a spring clip having a body portion coupled to the outboard portion of the caliper, and a pair of first flexible arms extending diametrically from the body portion and flexing resiliently within a first reference plane generally normal to the reference axis in order to abuttingly engage a respective first surface on the bracket. The spring clip further includes at least one second flexible arm extending from the body portion and flexing resiliently within a second reference plane generally parallel to the reference axis in order to abuttingly engage a respective second surface on the bracket. The spring clip resiliently biases the outboard portion of the caliper along the reference axis away from the rotor.

According to another aspect of the invention, a spring clip for a disc brake assembly includes a body portion adapted to be coupled to the outboard portion of a caliper, a pair of first arms extending diametrically from the body portion to resiliently flex within a first reference plane generally normal to the axis of caliper movement on a bracket, into engagement with a respective first, radially-disposed surface of the bracket. The spring clip according to the invention further includes at least one and, preferably, two second arms, each extending from the body portion to resiliently flex within a second reference plane generally parallel to the axis of caliper movement on the bracket, into engagement with a respective second, axially-disposed surface of the bracket.

Further objects, features and advantages of this invention will become readily apparent to persons skilled in the art after a review of the following description, with reference to the drawings and claims that are appended to and form a part of this specification.

DETAILED DESCRIPTION OF THE PREFERRED EMBODIMENT

Figure 1:
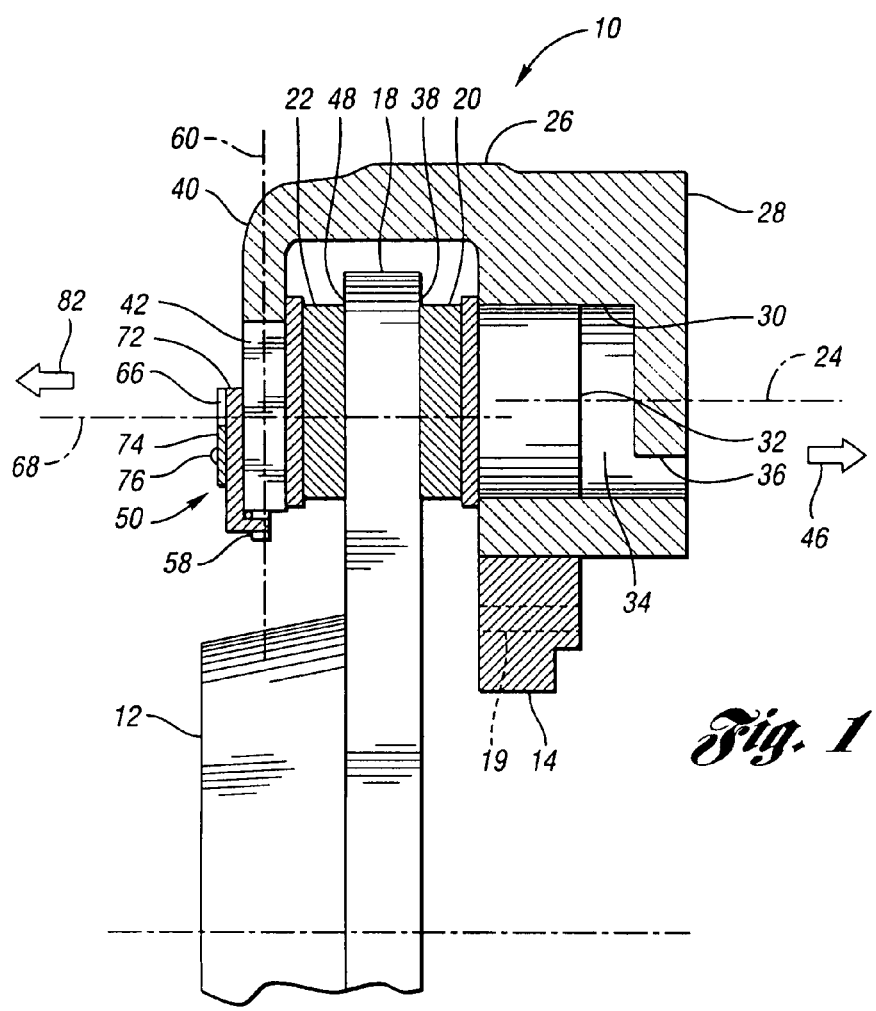
FIG. 1 is a partial cross-sectional view of an exemplary floating-caliper disc brake assembly according to the invention.
Figure 2:
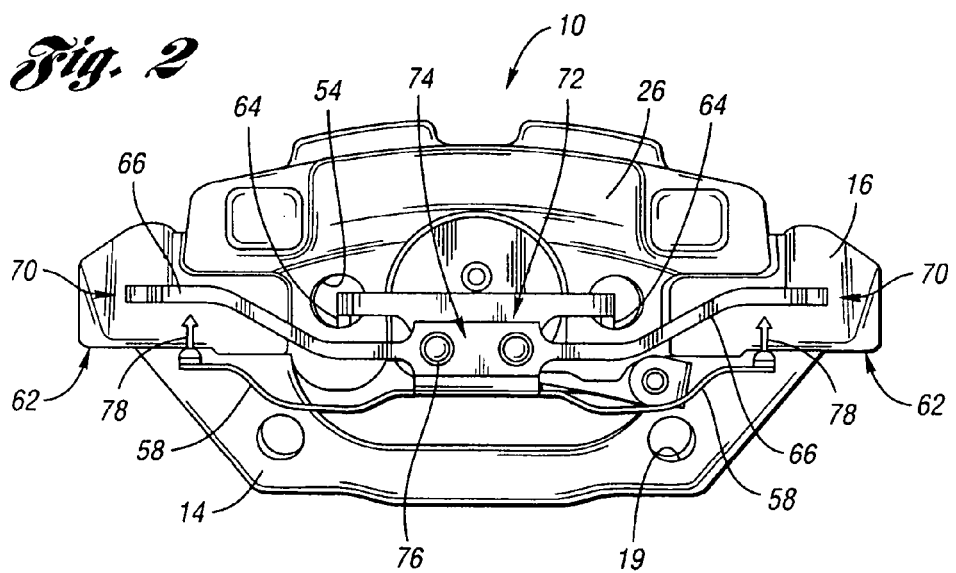
FIG. 2 is a bottom view of the floating caliper brake assembly shown in FIG. 1.

Referring to FIGS. 1 and 2, an exemplary disc brake assembly 10 according to the invention includes a rotor 12, and a bracket 14 supported on the motor vehicle such that a pair of arms 16 on the bracket 14 extend past the periphery 18 of the rotor 12. By way of example only, the bracket 14 is mounted, for example, to a knuckle or other suitable vehicle suspension or wheelend (not shown), as with a bolt (not shown) extending through complementary bores 19 in the bracket 14. The assembly 10 also includes a pair of brake pads 20,22, each slidably supported by the arms 16 of the bracket 14 on a respective side of the rotor 12, for movement along a reference axis 24. The assembly 10 further includes a floating caliper 26 slidably supported by the bracket 14, as by a pair of guide pins (not shown) secured to the bracket 14, likewise for movement along the reference axis 24.

The inboard portion 28 of the caliper defines a bore 30 in opposition with the inboard brake pad 20, and a piston 32 disposed within the bore 30 is operative, upon receiving a pressurized working fluid 34 through a inlet port 36, to urge the inboard brake 20 pad towards an inboard friction surface 38 defined on the rotor 12. The outboard portion 40 of the caliper 26 includes a pair of radially-inwardly-extending fingers 42 that engage the outboard brake pad 22, such that when the piston 32 is actuated and the inboard brake pad 22 urged by the piston 32 into engagement with the rotor's inboard friction surface 38, the caliper 26 moves in a first direction 46 along the reference axis 24 to thereby urge the outboard pad 22 into engagement with the rotor's outboard friction surface 48.

Figure 3:
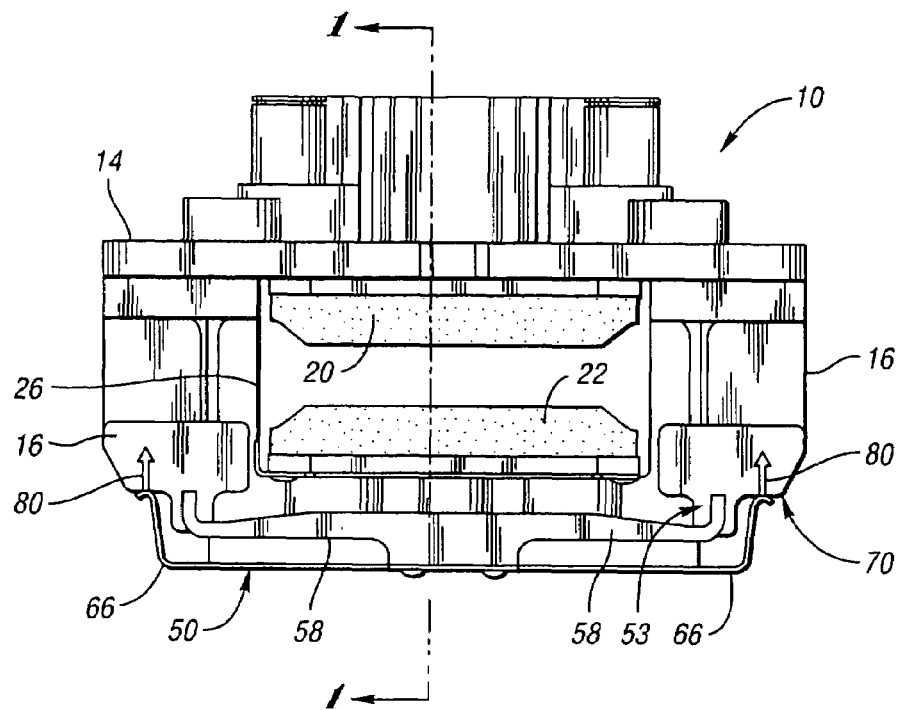
FIG. 3 is a front view of the floating caliper brake assembly shown in FIG. 1.

As best seen in FIGS. 2 and 3, the assembly 10 further includes a spring clip 50 having a body portion 52 that is coupled to the outboard portion 40 of the caliper 26. Specifically, each caliper finger 42 includes an aperture 54 within which to matingly receive a respective tab 56 defined on the body portion 52 of the spring clip 50. The spring clip 50 also includes a pair of first flexible arms 58 that extend diametrically from the body portion 52 of the spring clip 50. Each of the first arms 58 resiliently flexing within a first reference plane 60 generally normal to the reference axis 24 to abuttingly engage a respective first, radially-disposed surface 62 on the arms 16 of the bracket 14. Each tab 56 includes a radial projection 64 that facilitates retention of the spring clip 50 on the caliper 26.

Figure 4:
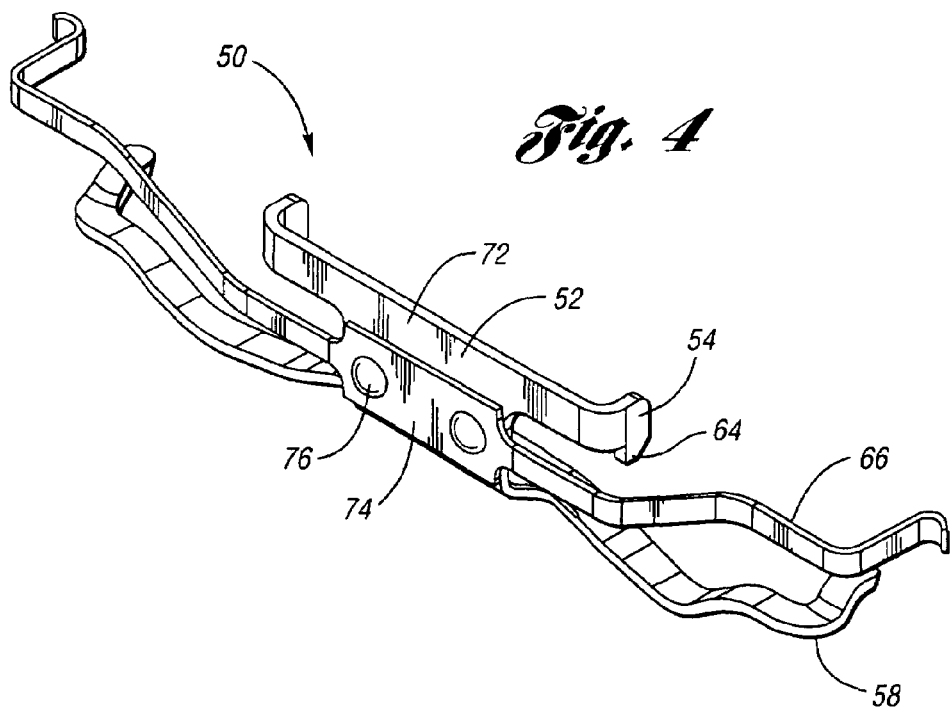
FIG. 4 is an isometric view of the spring clip shown in FIG. 1.

As seen in FIGS. 2–4, the spring clip 50 further includes a pair of second flexible arms 66 extending diametrically from the body portion 52. Each of the second arms 66 resiliently flexing within a second reference plane 68 generally parallel to the reference axis 24 to abuttingly engage a respective second, axially-disposed surface 70 on the arms 16 of the bracket 14, whereby the spring clip 50 resiliently biases the outboard portion 40 of the caliper 26 along the reference axis 24 away from the rotor 12.

In accordance with an aspect of the invention, and as illustrated in FIG. 4, the spring clip 50 is itself formed of two spring steel stampings 72,74, the first of which forms the body portion 52 and the first arms 58, and the second of which forms the second arms 66. While the invention contemplates securing the two stampings 72,74 together in any suitable manner, in the exemplary assembly 10, the two stampings 72,74 are affixed together by a rivet 76.

The use of different spring steel for the spring clip's first and second arms 58,66 advantageously provides a radial force 78, applied to the bracket's radially-disposed surfaces 62 by the spring clip's first arms 58, that is significantly greater than the axial force 80 applied by the spring clip's second arms 66 to the bracket's axially-disposed surfaces 70. Preferably, the first arms 58 together apply about 100 to about 140 Newtons of force on the radially-disposed surfaces 62 of the bracket 14, and the second arms 66 combine to exert about 15 to about 25 Newtons of force on the axially-disposed surfaces 70 of the bracket 14. The spring constant for each first arm 58 is preferably greater than about 15 N/mm and preferably less than about 25 N/mm. The spring constant for each second arm 66 is preferably greater than about 0.5 N/mm and preferably less than about 10 N/mm. In the exemplary assembly 10, each first arm 58 has a spring constant of about 12.3 N/mm and each second arm 66 has a spring constant of about 1.1 N/mm.

It will be appreciated, however, that the invention contemplates forming the spring clip of a single integral piece, such as stamped or formed sheet metal. Some advantages of a single-piece spring clip include a reduced part count and, perhaps, a higher strength. Where the spring clip is formed as a single piece, the arms 58,66 are preferably provided with different geometries, such as different bends and cross-sectional configurations and/or dimensions, to thereby provide the respective arms 58,66 with the desired spring constants.

In operation, when the piston 32 is actuated, the piston 32 urges the inboard brake pad 20 into engagement with the inboard friction surface 38 on the rotor 12, whereupon the caliper 26 moves in the first direction 46 along the reference axis 24, toward the centerline of the vehicle (not shown). The caliper 26 thus urges the outboard brake pad 22 into engagement with the outboard friction surface 48 of the rotor 12.

When the caliper 26 is released and the piston 32 recedes into the caliper bore 30, the axial force 80 applied by the second arms 66 of the spring clip 50 on the arms 16 of the bracket 14 urges the outboard portion 40 of the caliper 26 in a second direction 82 along the reference axis 24, away from the vehicle centerline. The outboard pad 22 is thus permitted to drift away from the outboard friction surface 48 of the rotor 24, unimpeded by the caliper fingers 42, to thereby prevent unnecessary pad wear. As a further benefit, the axial force 80 will often beneficially serve to distribute the air gap, cumulatively achieved between the pads 20,22, and the rotor friction surfaces 38,48, and otherwise defined by the piston roll-back, between the individual air gaps achieved between each pad 20,22 and its respective rotor friction surface 38,48.

The foregoing detailed description describes only a few of the many forms that the invention can take and should therefore be taken as illustrative rather than limiting. By way of example, while the exemplary disc brake assembly 10 includes a spring clip 50 that operates to urge the outboard portion 40 of the caliper 26 in the second direction 82, away from the vehicle centerline, the invention alternatively contemplates use of a spring clip that urges the inboard portion 28 of the caliper 12 in the first direction 46, toward the vehicle centerline. Similarly, while the invention is described above in the context of a floating-caliper disc brake assembly 10, the invention is suitable for use with a fixed-caliper disc brake assembly, for example, by using a spring clip to urge one or both brake pads away from the floating rotor.

We claim:

1. In a disc brake assembly including:
    a rotor having an inboard friction surface, an outboard friction surface, and a peripheral edge;
    a bracket supported proximate to the peripheral edge of the rotor, the bracket defining a pair of first, radially-disposed surfaces and at least one second, axially-disposed surface;
    an outboard brake pad slidably supported by the bracket opposite the outboard friction surface of the rotor for movement along a reference axis;
    a caliper slidably supported by the bracket for movement along the reference axis and bridging the peripheral edge of the rotor, the caliper having an outboard portion adapted to urge the outboard brake pad toward the rotor; and
    a spring clip having a body portion coupled to the outboard portion of the caliper, and a pair of first flexible arms extending diametrically from the body portion, each of the first flexible arms flexing resiliently within a first reference plane generally normal to the reference axis to abuttingly engage a respective first surface on the bracket,
    the improvement wherein the spring clip further includes at least one second flexible arm extending from the body portion, each of the at least one second flexible arm flexing resiliently within a second reference plane generally parallel to the reference axis to abuttingly engage a respective second surface on the bracket, whereby the spring clip resiliently biases the outboard portion of the caliper along the reference axis away from the rotor.

2. The disc brake assembly of claim 1, wherein each of the at least one second flexible arm has an initial spring constant of at least about 0.5 N/mm.

3. The disc brake assembly of claim 2, wherein each of the at least one second flexible arm has an initial spring constant no greater than about 10 N/mm.

4. The disc brake assembly of claim 1, wherein each of the at least one second flexible arm applies a maximum force of up to about 30 N against the respective second surface of the bracket.

5. The disc brake assembly of claim 3, wherein each of the at least one second flexible arm has a substantially rectangular cross-section.

6. The disc brake assembly of claim 1, wherein the first flexible arms are integrally formed with the body portion.

7. The disc brake assembly of claim 6, wherein each of the at least one second flexible arm is permanently affixed to the body portion.

8. The disc brake assembly of claim 1, wherein the body portion includes tabs which project from the body portion generally normal to the first reference plane, wherein the outboard portion of the caliper defines a plurality of apertures, and wherein the first flexible arms resiliently bias the tabs into engagement with the apertures.

9. A spring clip for a disc brake assembly, wherein the disc brake assembly includes a bracket, an outboard brake pad slidably supported by the bracket for movement along a reference axis, and a caliper slidably supported by the bracket for movement generally along the reference axis, the caliper having an outboard portion engaging the outboard brake pad, the spring clip comprising:
    a body portion adapted to be coupled to the outboard portion of the caliper;
    a pair of first arms extending diametrically from the body portion, wherein each first arm resiliently flexes within a first reference plane generally normal to the reference axis into engagement with a respective first surface of the bracket; and
    a pair of second arms extending diametrically from the body portion, wherein each second arm resiliently flexes within a second reference plane generally parallel to the reference axis into engagement with a respective second surface of the bracket.

10. The spring clip of claim 9, wherein each second arm has an initial spring constant of at least about 0.5 N/mm.

11. The spring clip of claim 10, wherein each second arm has an initial spring constant no greater than about 10 N/mm.

12. The spring clip of claim 11, wherein the at least one second flexing arm has a substantially rectangular cross-section.

13. The spring clip of claim 9, wherein the first arms are integrally formed with the body portion.

14. The spring clip of claim 13, wherein the at least one second arm is permanently affixed to the body portion.

15. The spring clip of claim 9, wherein the body portion includes tabs which project from the body portion generally normal to the first reference plane, the outboard portion of the caliper defines a plurality of apertures, and the first arms resiliently bias the tabs into engagement with the apertures.

16. A spring clip for a disc brake assembly, wherein the disc brake assembly includes a bracket, an outboard brake pad slidably supported by the bracket for movement along a reference axis, and a caliper slidably supported by the bracket for movement generally along the reference axis, the caliper having an outboard portion engaging the outboard brake pad, the spring clip comprising:
    a body portion releasably secured to the outboard portion of the caliper;
    a pair of first arms extending diametrically from the body portion, wherein each first arm resiliently flexes within a first reference plane generally normal to the reference axis into engagement with a respective first portion of the bracket, each first arm having an initial spring constant in a range between about 15 N/mm and about 25 N/mm;
    a pair of tabs projecting from the body portion through the first reference plane, the tabs being adapted to be received within the apertures of the outboard portion of the caliper, whereupon the resilient engagement of the first arms with the bracket releasably couples the tabs with the apertures of the outboard portion of the housing; and
    a pair of second arms extending diametrically from the body port on, wherein each second arm resiliently flexes within a second reference plane generally parallel to the reference axis into engagement with a respective second surface of the bracket, each second arm having an initial spring constant of at least about 0.5 N/mm.

17. The spring clip of claim 16, wherein each second arm has a spring constant no greater than about 10 N/mm.

18. The spring clip of claim 16, wherein each second arm has a substantially rectangular cross-section.

19. The spring clip of claim 16, wherein the first arms are integrally formed with the body portion.

20. The spring clip of claim 19, wherein the at least one second arm is permanently affixed to the body portion.

* * * * *

UNITED STATES PATENT AND TRADEMARK OFFICE
CERTIFICATE OF CORRECTION

PATENT NO. : 6,971,486 B2 Page 1 of 1
APPLICATION NO. : 10/793490
DATED : December 6, 2005
INVENTOR(S) : Scott M. Stickney et al.

It is certified that error appears in the above-identified patent and that said Letters Patent is hereby corrected as shown below:

Column 6,
Line 44, after "has a" insert -- spring constant no greater than about 10 N/mm. --.
Line 45, delete.

Signed and Sealed this

Twentieth Day of June, 2006

JON W. DUDAS
*Director of the United States Patent and Trademark Office*